July 31, 1934.    A. SELIGMANN    1,968,318
APPARATUS FOR PRODUCING SOLID CARBON DIOXIDE
Filed Jan. 15, 1932
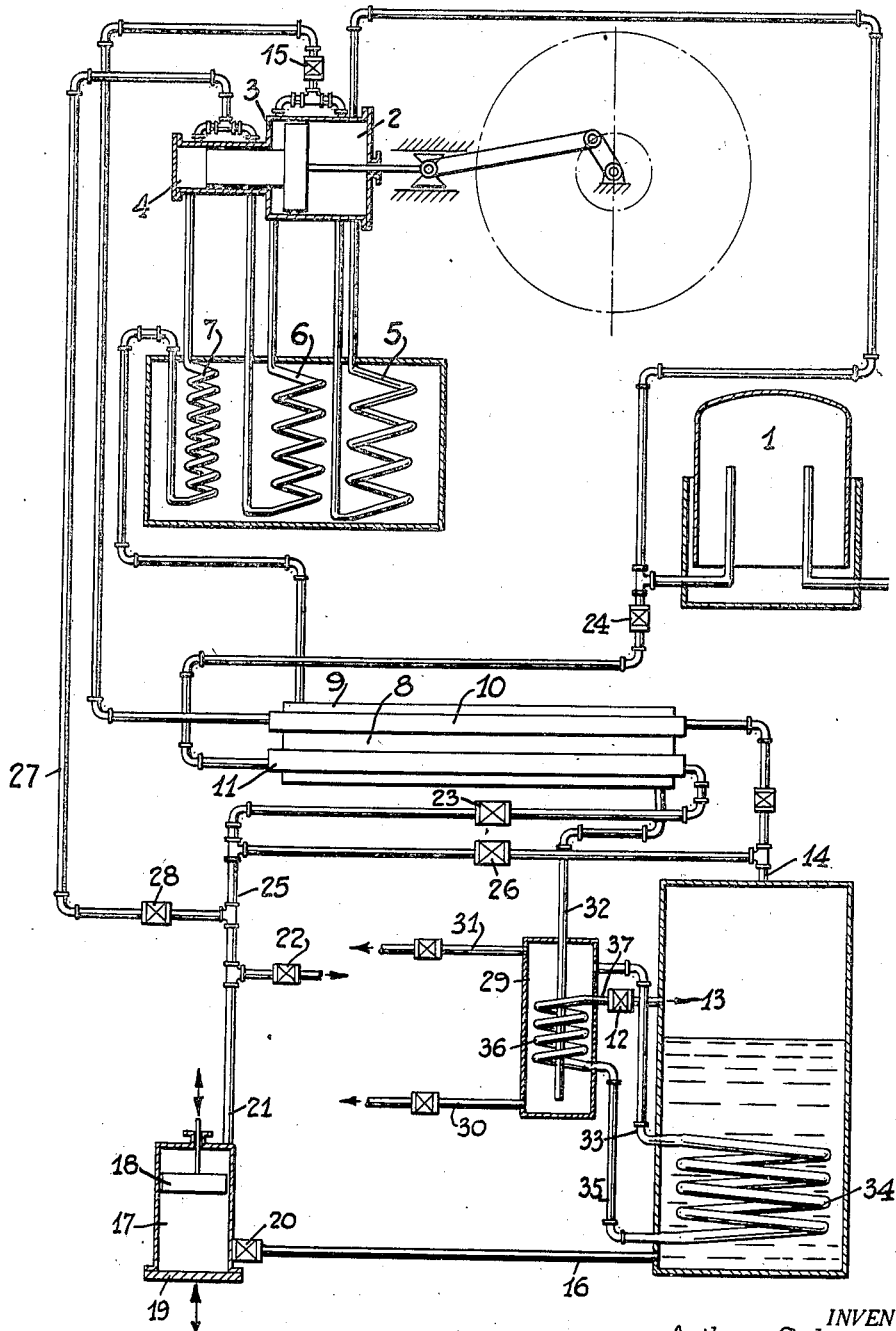
INVENTOR.
Arthur Seligmann.
BY
ATTORNEY.

Patented July 31, 1934

1,968,318

UNITED STATES PATENT OFFICE 1,968,318

APPARATUS FOR PRODUCING SOLID CARBON DIOXIDE

Arthur Seligmann, Dusseldorf, Germany

Application January 15, 1932, Serial No. 586,769
In Germany January 17, 1931

10 Claims. (Cl. 62—121)

My invention relates to the manufacture of solid carbon dioxide known as "Dry Ice", and the particular object of the present invention is to provide an apparatus which is so designed that the cooling of the liquid carbon dioxide will not progress to such an extent as to cause the entire plant to become frozen, thereby to avoid interruptions to operation of the plant due to freezing thereof.

For a complete understanding of my invention, I refer to the attached drawing wherein an apparatus embodying the present invention is diagrammatically illustrated.

By a well-known process carbon dioxide is solidified in the following manner, reference being had to the attached drawing. The gaseous carbon dioxide flowing from the container 1 passes to a plural-stage compressor, whereby it is gradually compressed to a high degree, as, for example, in the three cylinders 2, 3 and 4 shown in the drawing, being after each compressing operation cooled by a cooling medium, e. g. water, in the coolers 5, 6 and 7, until it becomes liquefied. The liquid carbon dioxide is then precooled in a heat-exchange device 8, working on the countercurrent principle, by cold medium pressure and low pressure gases. For instance, the high-pressure liquid passes through the outer pipe 9, while the medium- and the low-pressure gas pass respectively through the inner pipes 10 and 11 respectively provided within the outer pipe 9. According to the known process, the pre-cooled high-pressure liquid coming from the heat-exchange device is then expanded in a valve 12 to a pressure slightly higher than the triple point and is then injected into a vessel 13, which serves as pre-cooler, compensating and storage vessel for the liquid carbon dioxide. From this vessel the gas generated during the expansion, is removed at the upper end at 14 and, if desired, is returned through the heat-exchange device to the compressor. The pre-cooled liquid carbon dioxide is removed from the vessel 13 at 16 and conducted to the solidifying apparatus. The latter consists of a cylinder 17, wherein is moved back and forth a piston 18 which is permeable for gas. The cylinder is closed by a bottom plate 19, which can be removed. At first, the cylinder 17 is tightly closed by the said bottom plate, the piston 18 occupying its upper end position. When the valve 20 is opened, the cylinder 17 is filled with cold liquid carbon dioxide, the gases (air and carbon dioxide) in the cylinder being forced out through the conduit 21, passing either through valve 22 into the atmosphere, or through valve 23 into the low pressure portion 11 of the heat-exchange device 8, from which it returns through valve 24 into the compressor.

When the cylinder 17 has been filled, valve 20 is closed. The pressure in the cylinder, because of expansion of the liquid carbon dioxide drops, while evaporated carbon dioxide escapes through pipe 21, and with the decreasing pressure the temperature drops, until the triple point is reached. The pressure and temperature remain constant for a time, while another portion of the carbon dioxide evaporates, the remainder being converted into the solid state. The pressure then drops further, until atmospheric pressure is reached, during which time a further portion of the solid carbon dioxide evaporates with subsequent cooling. As soon as atmospheric pressure has been reached, the bottom plate 19 of the cylinder is removed, and by means of the piston 18 the block of solid carbon dioxide is ejected, which, if desired, can previously be compresed by the piston.

In the practice of this well-known process, it has been found that mainly because of stoppages in the injection valve 12 the entire plant is subjected to disturbances and requires the most exacting constant attention of the attendants. Even tho the working conditions are most scrupulously observed, the pipe 16 always would freeze so that it was never possible to produce in continuous operation more than a single block of solid carbon dioxide at a time. Several hours had to pass, until the pipe 16 was thawed out again for the operation to be resumed.

To avoid these drawbacks so as to insure a continuous operation of the plant is the object of the present invention.

In the first place, the valve 20 is placed as close to the cylinder 17 as possible so that almost in the entire pipe 16 a pressure of at least triple point pressure is maintained. In order to prevent the freezing of valve 20 itself, cylinder 17, by means of a special compensation conduit, is subjected to gas pressure so that no expansion occurs in the valve 20, the liquid carbon dioxide quietly passing through the valve causing no formation of carbon dioxide snow.

Tho in this manner the plant can be operated without any disturbance for several hours in succession, it will happen that because of a stoppage in the valve 12 the supply of fresh liquid carbon dioxide to the vessel 13 decreases and, unless the stoppage in valve 12 is immediately removed or the outlet valve in the conduit 14 is closed, the pressure will drop below the triple point, and the entire plant will freeze up which requires many hours, before operation can be resumed. This drawback in accordance with the present invention is overcome by the liquid carbon dioxide, prior to its injection into the vessel 13, being pre-cooled to a very low degree, an opportunity being thus offered to the foreign matter e. g. traces of water and lubricant, to become separated.

To recapitulate, in the first place, according to the present invention, the valve 20 is mounted directly in front of the cylinder 17, the valve-seat being preferably formed in the wall of the cylinder, so that the entire pipe 16 is always subjected to the pressure in vessel 13. Moreover, a special compensating conduit 25 is provided, whereby always prior to the filling of the cylinder 17, i. e. prior to the opening of valve 20, the cylinder is subjected to pressure of a gas. The latter can be supplied to the conduit 25 either from the upper portion of the vessel 13 by means of the valve 26, or from the second stage of the compressor through the conduit 27 and valve 28.

Furthermore, a special oil- and water separator 29 is provided. After its escape from the heat-exchange device 8, the pre-cooled carbon dioxide does not pass directly to the valve 12 through conduit 32, but passes through the latter first into the separator 29, where the carbon dioxide is cooled further. While in the heat-exchange device the liquid carbon dioxide is cooled to about 0° C., it is cooled in the separator 29 to −24° C. At that temperature, the foreign substances, e. g. water and lubricant, completely separate from the carbon dioxide and are removed by the pipes 30 and 31, depending on whether they are heavier or lighter than the carbon dioxide. The purified carbon dioxide passes through the conduit 33 into the pipe coil 34 resting in the liquid within the vessel 13. In said pipe-coil the carbon dioxide is cooled to approximately the temperature of the bath, say to about −52° C. It then passes through the conduit 35 into the pipe coil 36 provided in the separator 29, in which coil the temperature of the carbon dioxide rises again, say to about −28° C. imparting cold to the liquid coming from the heat-exchange device. Finally, the liquid carbon dioxide passes through the conduit 37 to the expansion valve 12.

The temperature of about −24° C. for the pre-cooling in the separator is selected, because in the first place, a very complete separation of all foreign matter takes place, and, furthermore, the lubricant is still viscous and, therefore, can be periodically removed through the pipe 31. If a lower temperature were selected, the lubricant would become solid, and it would be necessary to periodically thaw out the separator, in which case, of course, the entire plant would have to be stopped, or several separators would have to be provided. As the liquid used as cooling medium has a temperature of −52° C., there is danger of the cooling being carried too far. This, one can avoid by making the cooling surfaces of a size only to avoid too low a cooling, but such an exact calculation of the heat-exchange device meets with great difficulties and, moreover, can be made only for a definite amount of liquid. In actual operation, it easily happens that the amount of liquid varies, and if the amount decreases, the cooling would be too great and the lubricant would freeze in the separator. According to the present invention, this drawback is prevented by the heat exchange in the separator being made to take place by the liquids flowing in the same direction. Since in that case the temperatures of the liquid currents leaving the separator through the pipes 33 and 37 must be approximately the same, and since the amount of those liquid currents must be always exactly the same, it follows that the exit temperature must be about intermediate the two inlet temperatures, i. e. it must always have the desired degree of about −24° C.

I claim:

1. The method of pre-cooling liquid carbon dioxide and separating lubricant and foreign matter therefrom which comprises introducing liquid carbon dioxide at the bottom of a chamber, conducting the liquid carbon dioxide from the top of said chamber through a liquid carbon dioxide containing and expansion vessel in heat exchange relationship to liquid carbon dioxide contained in said vessel, then conducting the liquid carbon dioxide through said chamber in heat exchange relationship to the liquid carbon dioxide supplied to said chamber, and finally discharging the supplied liquid carbon dioxide into said vessel.

2. In apparatus for producing solid carbon dioxide, a vessel to receive liquid carbon dioxide, a solidifying chamber connected to said vessel to receive liquid carbon dioxide therefrom, a separator chamber adjacent to said vessel, means for the delivery of liquid carbon dioxide to a bottom part of said separator chamber, a conduit extending from a top part of said separator chamber into said vessel and submerged in liquid carbon dioxide therein, said conduit extending from the vessel into the separator chamber and being submerged in liquid carbon dioxide therein, said conduit finally extending from the separating chamber into the vessel to discharge therein, and a valve in the last mentioned portion of said conduit between the separating chamber and the vessel.

3. Apparatus as set forth in claim 2 in which the top part of the vessel is connected to the chamber in which the liquid carbon dioxide is solidified so that gas escaping from said vessel maintains a compensating pressure within said chamber to prevent rapid expansion and consequent solidification of the liquid carbon dioxide as it enters said chamber.

4. In apparatus for producing solid carbon dioxide, a vessel to receive liquid carbon dioxide, a solidifying chamber connected to said vessel to receive liquid carbon dioxide therefrom, a separator chamber adjacent to said vessel, a liquid carbon dioxide supply pipe opening into said separator chamber near the bottom thereof, a coil within the lower portion of said vessel, a pipe connecting an upper end portion of said separator chamber to one end of said coil, a coil within said separator chamber, a pipe connecting the second end of said first mentioned coil to one end of said second mentioned coil, a pipe connecting the other end of the second mentioned coil to the vessel and opening into the latter, and a valve in said last mentioned pipe.

5. The method of producing solid carbon dioxide, which comprises introducing gas into a chamber under a pressure to prevent rapid expansion and solidification of the liquid carbon dioxide supplied thereto, then introducing liquid carbon dioxide under pressure into said chamber, cutting off the supply of gas and liquid carbon dioxide, and relieving said chamber of carbon dioxide gas permitting the liquid carbon dioxide to solidify.

6. The method of producing solid carbon dioxide, which comprises supplying liquid carbon dioxide under pressure to an expansion vessel, conducting carbon dioxide gas from said vessel to a solidifying chamber at a pressure slightly below the pressure of the liquid carbon dioxide to prevent rapid expansion and solidification of the liquid carbon dioxide supplied to said chamber, conducting liquid carbon dioxide from said expansion vessel under pressure to said chamber, cutting off the supply of gas and liquid carbon dioxide, and relieving said chamber of carbon dioxide gas permitting the liquid carbon dioxide to solidify.

7. The method of producing solid carbon dioxide, which comprises passing the liquid carbon dioxide in heat exchange relationship with expanded liquid carbon dioxide, supplying the liquid carbon dioxide to a vessel, supplying gas under pressure to a solidifying chamber to prevent rapid expansion and solidification of the liquid carbon dioxide supplied thereto, then introducing liquid carbon dioxide from said vessel to said chamber, cutting off the supply of gas and liquid carbon dioxide, and relieving said chamber of carbon dioxide gas permitting the liquid carbon dioxide to solidify.

8. The method of producing solid carbon dioxide, which comprises passing liquid carbon dioxide through a heat exchange device in heat exchange relationship with cold liquid carbon dioxide, then conducting the liquid carbon dioxide to a vessel, supplying gas under pressure to a solidifying chamber to prevent rapid expansion and solidification of the liquid carbon dioxide supplied thereto, then introducing liquid carbon dioxide from said vessel to said chamber, cutting off the supply of gas and liquid carbon dioxide, and relieving said chamber of carbon dioxide gas permitting the liquid carbon dioxide to solidify.

9. Apparatus for producing solid carbon dioxide, comprising a vessel to receive liquid carbon dioxide, a solidifying chamber, a permeable piston movable in said solidifying chamber, means for admitting carbon dioxide gas to said solidifying chamber at its upper portion for compensating the pressure in said chamber, a conduit between said chamber and said vessel for conducting liquid carbon dioxide from said vessel to said chamber, and a valve in said conduit being seated in the wall of said chamber.

10. An apparatus as specified in claim 9, including a separator chamber adjacent to said vessel, means for delivering liquid carbon dioxide to said separator chamber, a conduit in said separator chamber being submerged in the liquid carbon dioxide therein and being connected with said vessel permitting pre-cooling of the liquid carbon dioxide prior to its being discharged into said vessel.

ARTHUR SELIGMANN.